(No Model.)
I. H. MALLIN.
SPACING RULE OR GAGE.
No. 543,997. Patented Aug. 6, 1895.
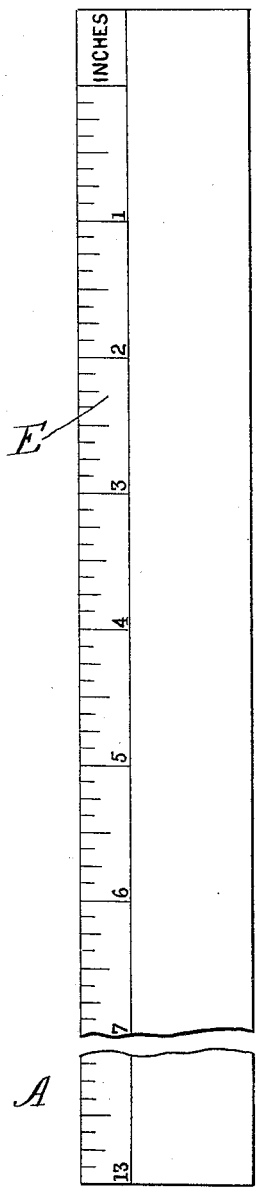

UNITED STATES PATENT OFFICE.

ISAAC H. MALLIN, OF CHICAGO, ILLINOIS.

SPACING RULE OR GAGE.

SPECIFICATION forming part of Letters Patent No. 543,997, dated August 6, 1895.

Application filed January 12, 1895. Serial No. 534,616. (No model.)

*To all whom it may concern:*

Be it known that I, ISAAC H. MALLIN, a citizen of the United States, residing at Chicago, in the county of Cook and State of Illinois, have invented certain new and useful Improvements in Spacing Rules or Gages, of which the following is a full, clear, and exact specification.

In copying type-written matter by means of a type-writer it is often found necessary or desirable to make what is known as a "line copy," and to copy the headings, &c., in the same relative position on the page as they occupy in the original. To accomplish this with accuracy heretofore it has been necessary to first count the number of characters and spaces in the heading or line, substract this number from the total number of spaces which the type-writer is capable of making, (which number in the Remington machine, for instance, is usually sixty-five,) and divide the result by two, the quotient being the number on the type-writer scale at which the carriage should be set for beginning the first letter or character of the heading or line to be copied.

My invention is designed to simplify this operation; and it therefore has for its object to provide a rule or gage by which may be determined the point at which to begin headings or words, or other matter having a central location with respect to the width of the page or the length of the line; also, to readily determine the location of such heading with respect to the length of the page, and when desired to readily determine the number of characters and spaces contained in a line, and the number of whole and half vertical spaces or lines that may be made on pages of a given or an ungiven length.

With these ends in view my invention consists in certain features of novelty, fully described herein with reference to the accompanying drawings, and more particularly pointed out in the claims.

In the said drawings, Figure 1 is a face view of my improved rule or gage, and Fig. 2 is a view of the opposite side thereof.

In carrying out my invention I combine with a fac-simile or a representation of the scale on the type-writer a column of figures or characters equal in number to approximately half the number of lateral spaces in the type-writer scale, and I arrange said scale and column in reverse order—that is to say, the lowest numbers or characters in the column are arranged opposite the highest numbers or characters in the type-writer scale.

Referring to the drawings, which show an embodiment of my invention thus described, A represents a strip or plate of any suitable material, along one edge of which is printed or otherwise indicated a representation or fac-simile B of the type-writer scale. This scale is shown as containing sixty-five spaces; but it is of course understood that the number of spaces vary in the different makes of machines, and hence the number shown in the drawings is merely an example.

C represents the column of figures or characters indicated on the rule in such a manner that the lowest character—to wit, 1—will fall opposite or correspond to the last two spaces in the scale B, and the succeeding characters or numbers in the column C will fall opposite or correspond, respectively, to each succeeding two spaces in the scale B, so that the numeral "1" in scale C will come opposite or correspond to spaces "64" and "65," numeral 2 opposite spaces "60" "61," and so on down to the beginning of scale B, where numeral "33" comes opposite or corresponds to "0" and space "1" of the scale B, the column C containing thirty-three numerals, as this number is the nearest whole number into which the scale B may be divided by two; but it is of course understood that should the number of spaces in the scale B be a multiple of two, then the whole numbers in the column C would be equal to half the number of spaces in the scale B, and such numbers in the column C will be placed opposite or correspond to every other division of the scale B.

In the use of my improved rule or gage, to determine the point on the type-writer at which the carriage should be set in order to copy a heading—such, for instance, as the word "specification"—in the middle of the page, with respect to its width or to the length of the succeeding lines, the scale B is placed along the word with its first space even with or opposite to the first letter or character of the word, and inasmuch as the example mentioned is fourteen spaces in length, including the period, it will be seen that the period, when the scale is arranged as described, will be opposite the number "6" in the column C. Hence if the carriage of the type-writer is set with its index at "6" on the type-writer scale and the word "specification" then written, such word will fall at the mid-length of the succeeding line or lines, assuming that the latter are sixty-five spaces in length. It is of course seen that with a type-writer scale containing an uneven number of spaces the heading, when its position is thus determined, will be one space out of center, but this distance is so slight as to not be perceptible.

The side of the rule opposite the scale B is divided off into spaces equal respectively to the whole and half lines or vertical spaces, and in order that the one row or column of figures may perform the twofold purpose of indicating with reference to the scale B the number on the type-writer scale at which to set the carriage, and also the number of vertical half spaces or lines that a sheet may be divided into, I continue the characters or numbers in the column C beyond "33" or beyond the last number corresponding to "1" and "0" on the scale B, whatever that number may be, up to "64" or any other number desired, sixty-four, however, being the maximum number of half vertical spaces contained in a sheet of ordinary legal cap.

On the extreme outer edge of the strip A, opposite the scale B, I arrange a column of figures or characters D increasing in arithmetical progression from "1" to "32" and arranged opposite every other one of the characters or numbers in the column C, the lowest character in column D being opposite "2" in the column C, and the edge of the rule on which column D is arranged being divided into spaces equal to the whole and half spaces respectively which the type-writer makes vertically throughout the length of the page. These vertical half-spaces in some instances will be equal to two of the spaces in the scale B, and where such is the case the lines or divisions $d$ which divide the column D may be extended entirely across the rule as continuations of every alternate division-mark on the scale B, thus facilitating the reading of the column C with reference to the scale B, it being understood that the characters in the column C which correspond to the number of vertical half-spaces, as well as to the lateral or lineal space at which the carriage should be set, are arranged between the scale B and the column of figures D, which indicate the whole vertical spaces. It will also be understood that both spaces in the scale B contained between the lines $d$ correspond to the number in the column C arranged opposite them. Hence if the word to be printed contains either twenty or twenty-one spaces the carriage should be set at "23" on the type-writer scale. It is to be understood, of course, that the number in column C is read with reference to the division in scale B directly opposite and also with reference to the division of scale B coinciding with line $d$ directly above or on the right of such number.

Should is be desired to locate a heading—such, for instance, as the word "specification"—at a certain distance above the first line or body of the specification, the word would first be measured by the scale B, to determine that it should be started at "26" on the type-writer scale. Then, to determine how many spaces should be made to get the word at the proper position with reference to the length of the page, the rule or gage is arranged lengthwise of the page with the numeral "1" in the column D coincident with the heading or word "specification," and the numeral in said column D which is opposite the first line of the body of the page will be the number of whole spaces to be made after writing the heading and before beginning the first line or body of the page. If the copy is to be made in half-spaces, then, of course, the numerals in the column C would be referred to in a similar manner.

The numerals on the scale B, and in fact all of the division-lines in scale B save the lines $d$, are of no importance when the rule may be placed upon the word to determine the number at which the carriage shall be set to begin the copy, because it is readily seen that the numeral in the column C opposite the last letter or character in the word or heading to be copied will be the number desired; but where the original is a manuscript, for instance, in which the length of the word or heading might be different from the length of the same word or heading when printed or written on a type-writer, or a different type-writer from that on which the original was written, it will be necessary to count the number of letters and spaces or characters in the line or heading to be copied and then find the corresponding number on the scale B, opposite which number, in the column C, will be found the number at which to arrange the carriage of the type-writer in making the copy.

In order that the number of vertical half or whole spaces that may be made on a page may be readily determined without laying the rule along the page where the length of the page is already known, I arrange on the reverse side of the plate or strip A or at any other convenient space, but preferably adjacent to the edge on which the column D is located, a scale divided into inches and their fractions, such as the scale E, which is preferably indicated directly opposite the column D on the reverse side of the plate A. Thus it will be seen that should it be known that the page is fifteen inches in length, for instance, by referring to the number in the column D directly opposite "15" inches it will be found that the page is capable of bearing thirty-two whole lines or sixty-four half-lines or vertical spaces.

Having thus described my invention, what I claim as new therein, and desire to secure by Letters Patent, is—

1. A rule or gage for the purpose described, having marked along one edge thereof a number of divisions or graduations representing a type writer scale, in combination with a row or column of figures approximately equal in number to half the number of spaces in said type writer scale, and being arranged in the reverse order of the graduations in said type writer scale, and division lines extending transversely across both said scale and column of figures, and each two of said division lines being so arranged as to inclose between them a single one of said numbers and two of the graduations in said scale, whereby each two of said graduations will be opposite a single one of said numbers and may be read with reference thereto, the column of numbers being as long as the said type writer scale, substantially as set forth.

2. A rule or gage for the purpose described, having a scale representing the type writer scale, in combination with a row or columns of characters approximately equal in number to half the number of spaces in the type writer scale which said first scale represents, the characters of lowest denomination in said column of characters being arranged to correspond with the spaces in said scale of highest denomination, substantially as set forth.

3. A rule or gage for the purpose described, having a scale divided into spaces corresponding to the scale of the type writer, in combination with a column divided into spaces corresponding to the vertical spacing of said type writer and said last spaces being numbered, and said numbers being arranged to correspond with every alternate space in said type writer scale, substantially as set forth.

4. A rule or gage for the purpose described, having a scale representing the type writer scale in combination with a column of numbers or characters representing the half vertical spacing of said type writer and a column of numbers or characters representing the whole vertical spacing of said type writer, the first said column being arranged between said scale and the last said column and each two spaces of said scale being arranged to correspond with one of the numerals or characters in said first column, substantially as set forth.

5. A rule or gage for the purpose described, having marked thereon a number of divisions or graduations representing a type writer scale, in combination with a column of figures approximately equal in number to half the number of divisions in said type writer scale and being arranged in the reverse order of the numbers in such type writer scale, each of said numbers of said column being arranged to correspond with two of the divisions in said type writer scale, substantially as and for the purposes set forth.

ISAAC H. MALLIN.

Witnesses:
F. A. HOPKINS,
EDNA B. JOHNSON.